US012037925B2

(12) United States Patent
Rosset

(10) Patent No.: US 12,037,925 B2
(45) Date of Patent: Jul. 16, 2024

(54) TURBINE ROTOR FOR A TURBOMACHINE AND METHOD FOR MOUNTING THE ROTOR

(71) Applicant: SAFRAN AIRCRAFT ENGINES, Paris (FR)

(72) Inventor: Patrice Jean-Marc Rosset, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/917,151

(22) PCT Filed: Mar. 29, 2021

(86) PCT No.: PCT/FR2021/050550
§ 371 (c)(1),
(2) Date: Oct. 5, 2022

(87) PCT Pub. No.: WO2021/205094
PCT Pub. Date: Oct. 14, 2021

(65) Prior Publication Data
US 2023/0160313 A1 May 25, 2023

(30) Foreign Application Priority Data
Apr. 7, 2020 (FR) ....................................... 2003446

(51) Int. Cl.
*F01D 5/30* (2006.01)
*F01D 11/00* (2006.01)

(52) U.S. Cl.
CPC ......... *F01D 5/3007* (2013.01); *F01D 5/3015* (2013.01); *F01D 11/006* (2013.01); *F05D 2220/32* (2013.01)

(58) Field of Classification Search
CPC .... F01D 5/3007; F01D 5/3015; F01D 11/006; F05D 2220/32
See application file for complete search history.

(56) References Cited

U.S. PATENT DOCUMENTS

| | | | | |
|---|---|---|---|---|
| 3,137,478 A * | 6/1964 | Farrell | .................. | F01D 5/3015 416/193 A |
| 2014/0356173 A1* | 12/2014 | Evain | ......................... | F01D 5/10 416/193 A |

(Continued)

FOREIGN PATENT DOCUMENTS

| | | | |
|---|---|---|---|
| EP | 1944472 A1 * | 7/2008 | ............ F01D 11/006 |
| FR | 1 362 926 A | 6/1964 | |

OTHER PUBLICATIONS

Engle, Machine Translation of EP1944472, 2008 (Year: 2008).*
International Search Report as issued in International Patent Application No. PCT/FR2021/050550, dated Jul. 15, 2021.

*Primary Examiner* — Christopher Verdier
*Assistant Examiner* — Michael K. Reitz
(74) *Attorney, Agent, or Firm* — Pillsbury Winthrop Shaw Pittman LLP

(57) ABSTRACT

A turbine rotor includes a disc with cavities, a plurality of blades, each with a root received in one of the cavities, and an axial retention system including a first series and a second series of strips circumferentially distributed around an axis of the rotor, the first and the second series being axially superimposed and arranged such that at least two strips circumferentially adjacent to the first series are axially superimposed on a strip of the second series and each strip of the first and second series is arranged opposite a cavity of the disc so as to axially block the root of a blade.

14 Claims, 3 Drawing Sheets

(56) References Cited

U.S. PATENT DOCUMENTS

| | | | | |
|---|---|---|---|---|
| 2015/0369062 | A1* | 12/2015 | Tanaka .................. | F01D 5/3015 29/889.21 |
| 2016/0130977 | A1* | 5/2016 | Snyder .................. | F01D 5/3015 415/182.1 |
| 2016/0186590 | A1* | 6/2016 | Himes .................. | F01D 11/006 29/889.21 |
| 2020/0056492 | A1 | 2/2020 | Shemyatovskiy | |

* cited by examiner

[Fig. 1]
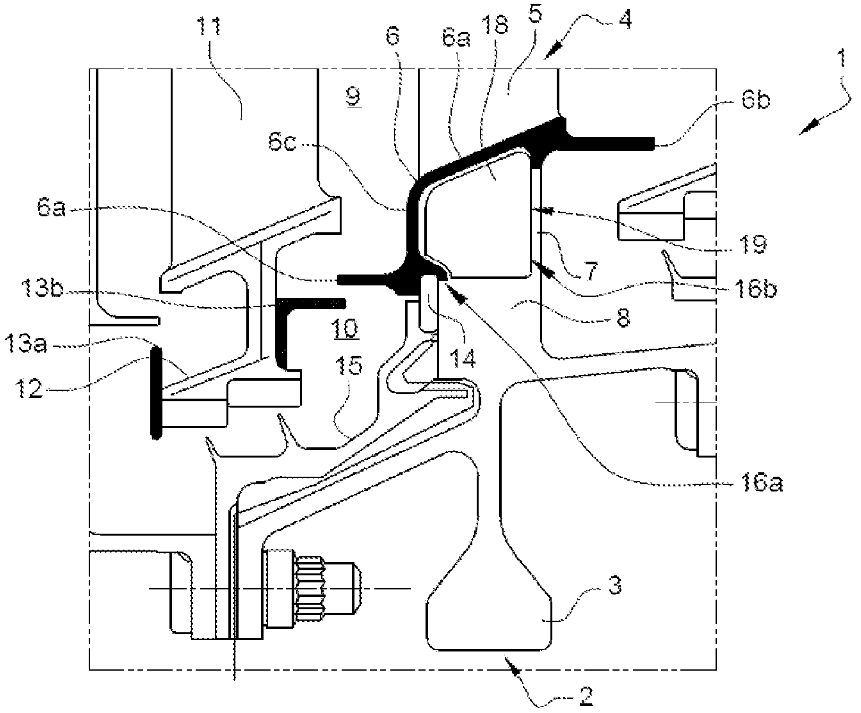
[Fig. 2]
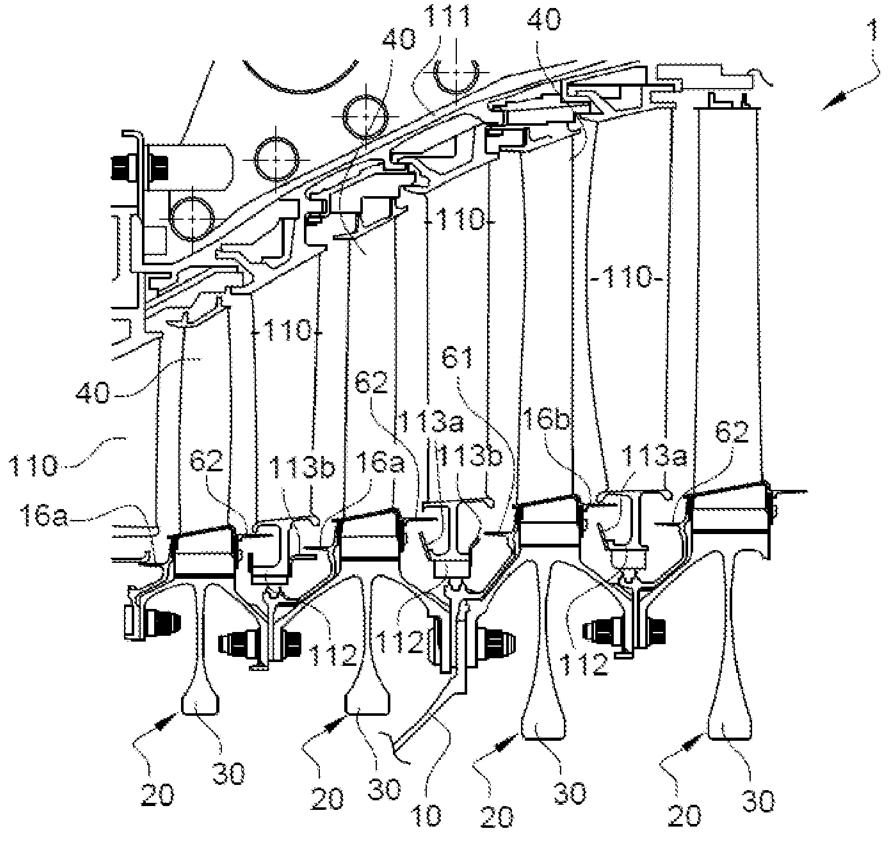

[Fig. 3]
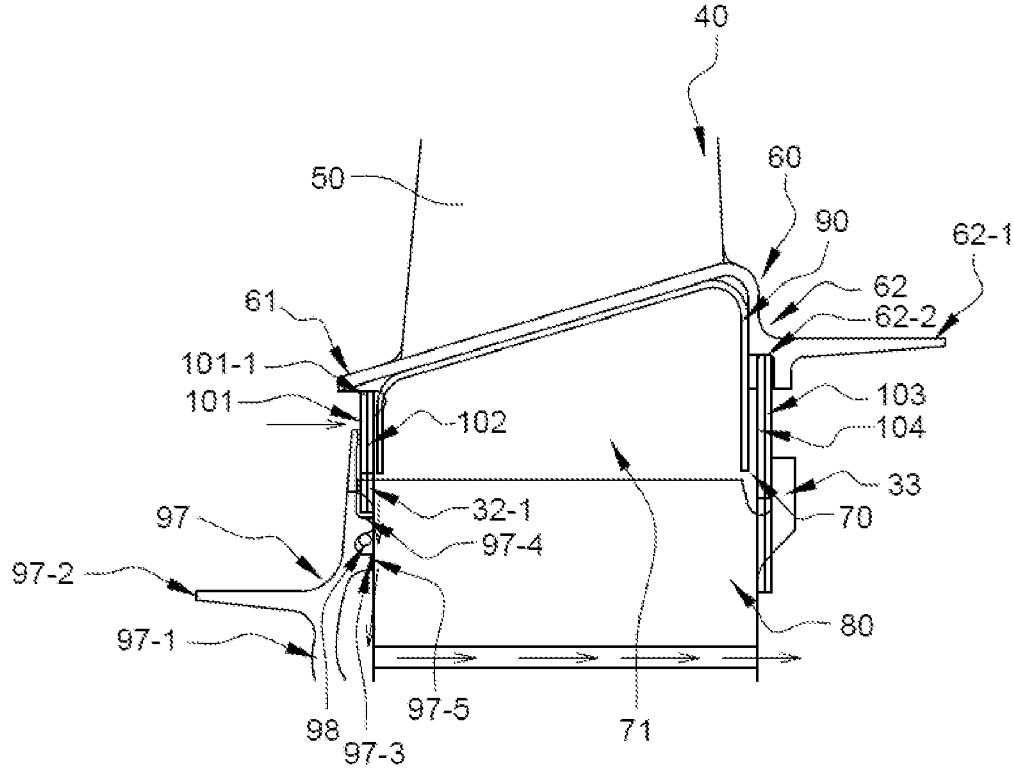
[Fig. 4]
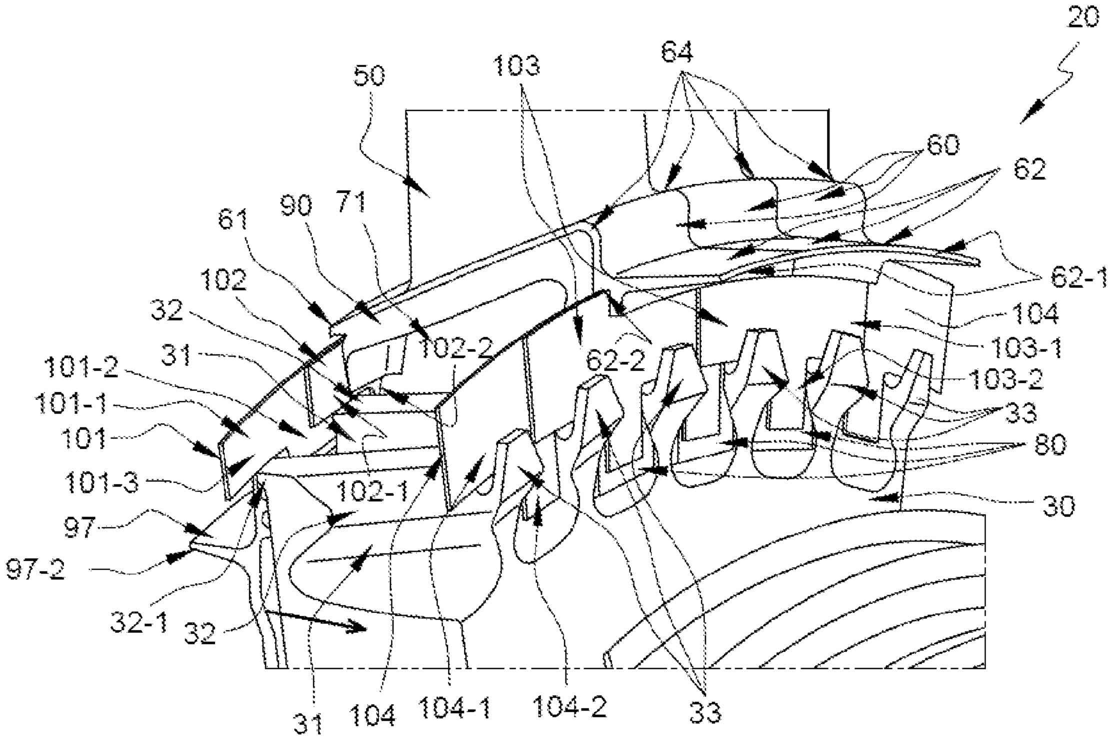

[Fig. 5]
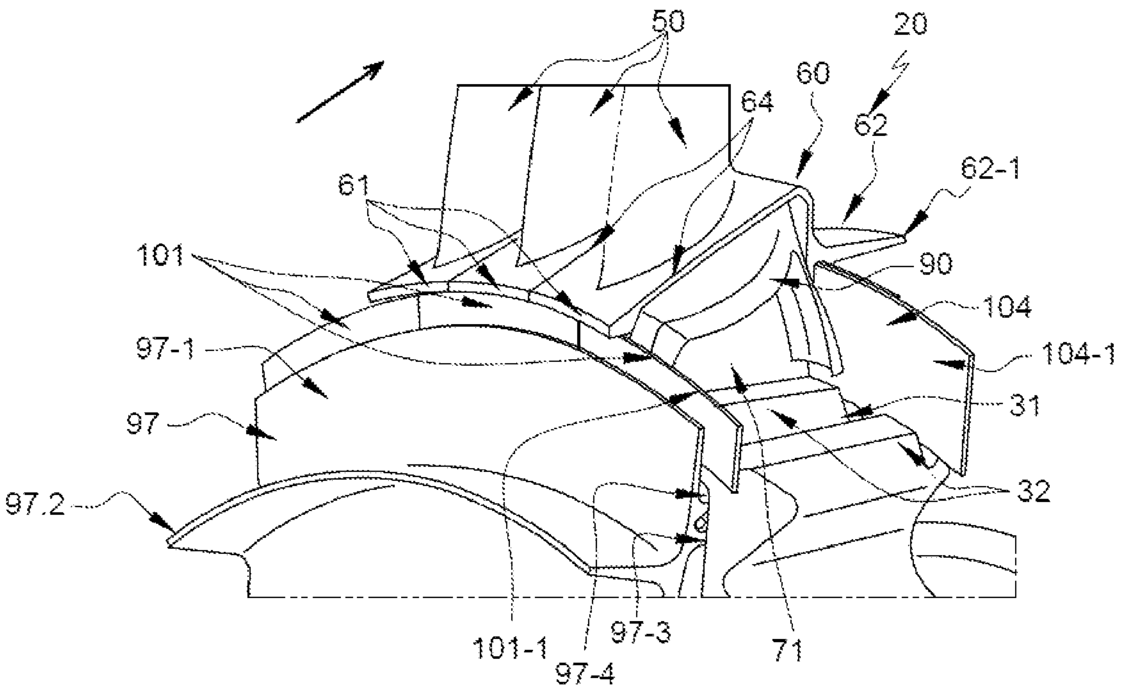

TURBINE ROTOR FOR A TURBOMACHINE AND METHOD FOR MOUNTING THE ROTOR

CROSS-REFERENCE TO RELATED APPLICATIONS

This application is the U.S. National Stage of PCT/FR2021/050550, filed Mar. 29, 2021, which in turn claims priority to French patent application number 2003446 filed Apr. 7, 2020. The content of these applications are incorporated herein by reference in their entireties.

TECHNICAL FIELD OF THE INVENTION

The invention relates to the general field of turbomachines.

The invention relates more particularly to a high- or low-pressure turbine rotor, and to a turbomachine comprising said rotor. The invention also relates to a method for mounting said rotor.

TECHNOLOGICAL BACKGROUND OF THE INVENTION

Aeronautical turbomachines typically comprise several modules such as a low-pressure compressor, a high-pressure compressor, a combustion chamber, a high-pressure turbine followed by a low-pressure turbine, which drive the corresponding low-pressure or high-pressure compressor, and a gas ejection system. Each of the turbines is formed of one or more stages, each stage successively including a wheel of stationary vanes, called the guide vane, and a wheel of moving vanes, called the rotor.

In the present application, the terms "outer" and "inner", "upper" and "lower", "outside" and "inside" are used in reference to the position of a piece or surface relative to the longitudinal axis of the turbomachine. Furthermore, the terms "radial" and "axial" respectively correspond to an axial direction, parallel to the longitudinal axis of the turbomachine, and to a radial direction, that is, perpendicular to the longitudinal axis of the turbomachine. Furthermore, the terms "upstream" and "downstream" are used in reference to the flow direction of the airflow in the turbomachine, as illustrated in the figures by an arrow.

FIG. 1 is an axial cross-sectional view of a part of a turbine rotor according to prior art, taken at one of the vane roots mounted circumferentially around a rotor disc.

With reference to FIG. 1, the stationary vanes 11 of the guide vanes are joined together at their radially inner ends by annular sectors placed circumferentially end to end so as to form an inner shroud 12 and are mounted at their radially outer ends on a casing (not represented) of the turbine.

In addition, the rotor comprises a disc 3 comprising, at its outer periphery, teeth delimiting slots in which the moving vanes 4 are engaged by their respective roots 8. Each moving vane 4 comprises a blade 5 fitted with a platform 6 connected to a stilt 7 which radially extends to a root 8. The roots 8 of the moving vanes 4 are retained radially in the slots of the disc 3 by their bulbous section, called a dovetail section, and axially by an annular ring 14 which is in axial abutment against the upstream face of the roots 8 of the moving vanes 4. The annular ring 14 is held radially in upstream grooves 6*c* formed at the inner faces of the platforms 6 and axially by an annular upstream clamp 15 fixed to the disc 3.

In order to improve the performance of the turbomachine, and to avoid overheating of the disc 3 by the flow of hot gases coming from the upstream combustion chamber and flowing through the flow stream 9 of the turbine, it is important to limit as much as possible the circulation of these gases radially from the outside to the inside, that is from the stream 9 to the zone 10 located between the platforms 6 of the moving vanes 4 and the disc 3. Indeed, the part of the gases of the stream 9 flowing radially under the platforms 6 does not contribute to the rotation of the moving vanes 40 and directly heats the teeth of the disc 3. Moreover, the cooling of the disc 3 and of the roots 8 of the moving vanes 4 is ensured by ports (not illustrated) provided in the upstream clamp 15 which ensure the routing of a cold air flow towards the bottom of the slots of the disc 3. Therefore, it is also necessary to limit the passage of the cold air flow radially from the inside to the outside.

To limit the circulation of gases between the stream 9 and the zone 10 located between the platforms 6 of the moving vanes 4 and the disc 3, it is known to fit the platform 6 of each moving vane 4 with an upstream spoiler 6*a* and a downstream spoiler 6*b* which define a sealing baffle, respectively, with a downstream spoiler 13*b* and an upstream spoiler 13*a* formed axially projecting on the annular sectors of the inner shrouds 12 located, respectively, upstream and downstream of the rotor.

Furthermore, sealing between the platforms 6 is ensured by sealing plates 18, also called "candies", which are mounted between the moving vanes 4, in side cavities 19 provided in the stilts 7 of the moving vanes 4. In particular, each sealing plate 18 is mounted between two circumferentially adjacent moving vanes 4 and comprises a circumferential end part housed in the side cavity 19 of a moving vane 4 and an opposite circumferential end part housed in the side cavity 19 of the adjacent moving vane 4. These sealing plates 18 fit snugly the inner shape of the side cavities 19 with small clearances. In operation, these sealing plates 18 are subjected to centrifugal forces and are radially pressed against the inner faces of the main walls of the platforms 6, thus preventing the radial passage of hot gases from the stream to the zone 10 located radially below the platforms.

In addition, each moving vane 4 includes an upstream low wall 16*a* and a downstream low wall 16*b* extending radially between the root 8 and the platform 6 of each moving vane 4 which encompass and restrict the bypass of the gas flow flowing into the stream 9. Furthermore, the upstream 16*a* and downstream 16*b* low walls limit the leakage of gas from the stream 9 that wants to bypass the moving vane 4 by passing through the root 6 of the moving vane 4.

Moreover, in addition to ensuring sealing in the turbine, the reduction in the mass of the constituent elements of the turbomachine is a constant concern which has led to the development of vanes whose blades are made of a ceramic matrix composite material, called C.M.C.

While the use of C.M.C. material makes it possible to reduce the weight of the vanes and to increase their resistance to high temperatures, it also requires the geometry of the moving vanes 4 to be reviewed because of the restrictions of the method for manufacturing C.M.C. pieces. Indeed, it is complicated to make a moving vane fitted with a platform which has a structure similar to that described above, because such a structure generates especially problems of twisting of the fibres of the material during its manufacture. Of course, this problem of simplification of the structure of the platforms can also arise with other types of vanes.

SUMMARY OF THE INVENTION

The invention offers a solution to the above-mentioned problems by providing a turbine rotor including vanes, for example made of C.M.C., whose structure is simplified and sealing is ensured.

A first aspect of the invention relates to a turbine rotor extending about an axis and comprising:

- a disc centred on the axis of the rotor and including slots and teeth in an outer periphery of the disc, the slots being circumferentially distributed around the disc and the teeth each being delimited by two circumferentially adjacent slots,
- a plurality of vanes, each vane comprising:
  - a blade extending radially with respect to the rotor axis,
  - a root provided in radial extension of the blade, configured to be mounted in a respective slot of the disc,
  - a platform located between the blade and the root of the vane, wherein, the disc comprises axial retention means configured to axially hold the roots of the vanes in the slots of the disc, the axial retention means including a first series and a second series of lamellae circumferentially distributed about the axis, the first series and the second series of lamellae being axially superimposed and arranged such that:

- at least two circumferentially adjacent lamellae of the first series are axially superimposed on a lamella of the second series and circumferentially offset,
- each lamella of the first and second series is disposed facing a slot of the disc so as to axially block the root of a vane mounted in said slot of the disc.

By replacing the annular ring with the first series and second series of lamellae, the axial retention of the vanes is ensured as well as the sealing between the vanes by means of the lamellae of the first series overlapping the lamellae of the second series, which makes it possible to eliminate the upstream and downstream low walls. The elimination of the upstream and downstream low walls makes it possible to reduce the height of the stilt and therefore to reduce the mass of the vane.

Furthermore, due to the axial superposition of the lamellae of the first series and of the second series, such axial retention means are mechanically more resistant than the annular ring, to the stresses exerted by the hot gases during operation of the rotor.

Moreover, the replacement of the annular ring by the lamellae of the first and second series makes it possible to reduce the problems of differential expansion between the axial retention means and the vanes during operation of the rotor. Indeed, the increase in the total volume of the plurality of lamellae due to thermal expansion is less than the increase in the total volume of the annular ring. Also, the lamellae are less likely to stress adjacent pieces, that is, adjacent lamellae and vane platforms, thus limiting deformation or even breakage of these pieces during operation of the rotor.

In addition, the smaller lamellae are easier to mount and dismount than the annular ring. Furthermore, maintenance of the rotor is facilitated as it is sufficient to replace only the degraded lamella(s) and not the whole annular ring.

Furthermore, the lamellae are easier to manufacture than the annular ring, especially as it is easier to size the lamellae than the annular ring, In addition to the characteristics just mentioned in the preceding paragraph, the turbine rotor according to the first aspect of the invention may have one or more complementary characteristics among the following, considered individually or according to all technically possible combinations.

According to a non-limiting embodiment, each vane includes a stilt located between the root and the platform of said vane and having an upstream face and a downstream face and in that the lamellae of the first and second series have the general shape of a T, each of said lamellae including:

- a radially outer portion configured to face one face of at least two circumferentially adjacent stilts or to face at least two circumferentially adjacent lamellae (101, 102, 103),
- a radially inner portion configured to face a root of a vane.

According to a non-limiting embodiment, the first series and the second series of lamellae include upstream lamellae mounted upstream of the disc, the upstream lamellae of the first series and of the second series being axially superimposed and arranged such that:

- at least two circumferentially adjacent upstream lamellae of the first series are axially superimposed on an upstream lamella of the second series and,
- each upstream lamella of the first and second series is disposed facing a slot of the disc so as to axially block the root of a vane mounted in said slot of the disc.

According to a non-limiting embodiment, the axial retention means include an annular upstream clamp fixed on the one hand to the disc and holding on the other hand the upstream lamellae of the first series and of the second series against the disc.

According to a non-limiting embodiment, the upstream clamp has an upstream edge axially extending to an annular upstream spoiler. Thus, the upstream so spoiler of the platform of the moving vane is transferred to the upstream clamp, which simplifies the structure of the platform of the moving vanes and thus facilitates its manufacture, which is particularly interesting when the vanes are made of a ceramic matrix material.

According to a non-limiting embodiment, the platform of each vane includes a main wall having an upstream rim, each upstream lamella of the first series and of the second series bearing radially against at least one inner face of an upstream rim.

According to a non-limiting embodiment, the first series and the second series of lamellae include downstream lamellae mounted downstream of the disc, the downstream lamellae of the first series and of the second series being axially superimposed and arranged so that:

- at least two circumferentially adjacent downstream lamellae of the first series are axially superimposed on a downstream lamella of the second series and,
- each downstream lamella of the first and second series is disposed facing a slot of the disc so as to axially block the root of a vane mounted in said slot of the disc.

According to a non-limiting embodiment, the axial retention means include radially inner holding means and radially outer holding means configured to hold axially and radially the downstream lamellae of the first and second series facing the slots of the disc.

According to a non-limiting embodiment, the radially inner holding means are formed by radial hooks of the disc, each radial hook extending radially from a downstream face of a tooth of the disc and being configured to receive a circumferential end of a radially outer portion of a downstream lamella.

In a non-limiting embodiment, the radially outer holding means are formed by radial grooves formed in the platforms of the vanes, each radial groove being provided in an inner face of a downstream rim of a platform and being configured to receive the radially outer portion of a downstream lamella.

According to a non-limiting embodiment, the vanes and lamellae are made of different materials.

According to a non-limiting embodiment, the vanes are made from a ceramic matrix material.

According to a non-limiting embodiment, the lamellae are made from a metal material.

A second aspect of the invention relates to a turbomachine comprising at least one turbine rotor according to the first aspect.

A third aspect of the invention relates to a method for mounting a turbine rotor according to the first aspect of the invention including the following steps:

Inserting the roots of the vanes into the slots of the disc,

Positioning the first series and the second series of lamellae so that at least two circumferentially adjacent lamellae of the first series are axially superimposed on a lamella of the second series and each lamella of the first and second series is disposed facing a slot of the disc so as to axially block the root of a vane mounted in said slot of the disc.

The invention and its various applications will be better understood upon reading the following description and examining the accompanying figures.

BRIEF DESCRIPTION OF THE FIGURES

The figures are set forth by way of illustration and are by no means limiting.

FIG. 1 is an axial cross-sectional view of the part of a rotor, according to prior art, taken at a vane root mounted in a slot of the rotor disc.

FIG. 2 is a partial axial cross-sectional view of a turbomachine turbine.

FIG. 3 is an axial cross-sectional view of the part of a rotor, according to one embodiment of the invention, taken at a vane root mounted in a slot in the rotor disc.

FIG. 4 is a perspective view, from downstream of the turbine, of the rotor represented in FIG. 3.

FIG. 5 is a perspective view, from upstream of the turbine, of the rotor represented in FIG. 3.

DETAILED DESCRIPTION

Unless otherwise specified, a same element appearing in different figures has a single reference.

The invention relates to a rotor 20 of a turbine 1 for a turbomachine.

It is reminded that a turbomachine generally comprises, from upstream to downstream in the flow direction of gases, a fan, one or more compressor stages, for example a low-pressure compressor and a high-pressure compressor, a combustion chamber, one or more turbine stages, for example a high-pressure turbine and a low-pressure turbine, and a gas exhaust nozzle.

FIG. 2 is a partial axial cross-sectional view of a high- or low-pressure turbine of the turbomachine.

With reference to FIG. 2, the turbine 1 comprises a number of vane stages, each stage including a wheel of stationary vanes 110, called the guide vane, and a wheel 20 of moving vanes 40, called the rotor.

The wheels of stationary vane 110 are mounted via their radially outer ends to an outer casing 111 of the turbine 1 and are joined together at their radially inner ends by annular sectors of inner shroud 112 placed circumferentially end to end and carrying blocks of abradable material.

The wheels 20 of moving vanes 40 are axially assembled to each other by annular flanges and each include a disc 30 carrying individual moving vanes 40. The rotor 20 is connected to the shaft of the turbine 1 via a drive cone 10.

In operation, the stationary vanes 110 of the guide vane and the moving vanes 40 of the rotor 20 are exposed to hot gases flowing into the stream of the turbine 1 from the combustion chamber.

In the following description, the term "vane" will be used to refer to a rotor moving vane.

FIG. 3 is an axial cross-sectional view of the portion of the rotor 20, according to one embodiment of the invention, taken at a vane root mounted in a slot 31 of the disc 30 of the rotor 20 of the turbine 1.

With reference to FIG. 3, each vane 40 comprises a blade 50 connected by a platform 60 to a middle portion or stilt 70 which radially extends to a root 80.

As can be seen in FIGS. 4 and 5, the roots 80 of the vanes 40 are engaged in slots 31 provided in the outer periphery of the disc 30. The slots 31 are regularly distributed about the axis X of rotation of the rotor 20 and delimit teeth 32 between them.

Moreover, each platform 60 includes a main wall delimited by an upstream rim 61, a downstream rim 62 and thus by two circumferential edges 64. In order to limit gas leakage at the clearances between the circumferential edges 64 of the platforms 60, each vane 40 comprises two side cavities 71 provided in the stilt 70, inside which sealing members 90 called "candies" are positioned. Each sealing member 90 is mounted between two circumferentially adjacent vanes 40 and comprises a circumferential end part housed in the side cavity 71 of a vane 40 and an opposite circumferential end part housed in the side cavity 71 of a circumferentially adjacent vane 40. These sealing members 90 are formed by a plate which fits snugly the inner shape of the side cavities 71 with small clearances. In operation, these sealing members 90 are subjected to centrifugal forces and are radially pressed against the inner faces of the side cavities 71 so as to prevent the radial passage of hot gases from the stream to the zone located between the platform 60 and the disc 30. These sealing members 90 also provide damping of the vibrations to which the vanes 40 are subjected in operation.

The roots 80 of vanes 40 are retained radially in the slots 31 by their bulbous section, called dovetail section. Furthermore, the roots 80 of the vanes 40 are axially retained in the slots 31 of the disc 30 by axial retention means.

The axial retention means include upstream lamellae 101, 102 disposed upstream of the disc 30 and an upstream clamp 97 which holds said upstream lamellae 101, 102 against the disc 30.

The upstream clamp 97 is fixed to the disc 30 of the rotor 20 and is in the form of a piece of revolution, whose axis of revolution is the same as the axis of rotation X of the rotor 20.

The upstream clamp 97 has an upstream edge 97-1 axially extending to an annular upstream spoiler 97-2 which defines a sealing baffle with a downstream spoiler 113*b*, visible in FIG. 2, provided in the annular sectors of the inner shroud 112 located upstream of the rotor 20. The overlay of the upstream spoiler 97-2 provided in the upstream clamp 97 and the downstream spoiler 113*b* provided in the inner shroud 112 limits the passage of hot gases radially from the outside to the inside, that is from the annular flow stream of the hot gas flow to the zone located between the platform 60 of the vanes and the disc 30, and conversely of a cold air flow radially from the inside to the outside. Furthermore, the downstream rim 62 of the main wall of the platform 60 axially extends to a downstream spoiler 62-1 which defines a sealing baffle with an upstream spoiler 113*a*, visible in FIG. 2, provided in the annular sectors of the inner shroud 112 located downstream of the rotor 20.

Moreover, the upstream clamp 97 has a downstream edge 97-3 which bears axially against the disc 30 and faces the upstream face of the roots 80 of the vanes 40. Advantageously, the upstream clamp 97 includes sealing means formed by an O-ring 98 disposed, between the upstream clamp 97 and the disc 30, in an annular groove 97-5 provided in a radially inner part of the downstream edge 97-3 of the upstream clamp 97.

Moreover, in order to hold axially and radially the upstream lamellae 101, 102 against the disc 30, the upstream clamp 97 includes an annular shoulder 97-4 provided in a radially outer part of its downstream edge 97-3. Advantageously, the annular shoulder 97-4 forms a radial bearing surface and an axial bearing surface defining a housing for receiving the upstream lamellae 101, 102.

The upstream lamellae 101 102 are disposed facing the slots 31 of the disc 30 so as to axially block the roots 80 of the vanes 40 in said slots 31. In addition, each lamella 101, 102 has a radially inner end which bears radially against the radial bearing surface formed by the annular shoulder 97-4 and a radially outer end which bears radially against an inner face of the upstream rim 61 of a platform 60.

The upstream lamellae 101, 102 consist of a first series and a second series circumferentially distributed about the axis X of the rotor 20 and axially superimposed. In particular, the upstream lamellae 101 of the first series are positioned between the axial bearing surface, formed by the annular shoulder 97-4 of the upstream clamp 97, and the upstream faces of the upstream lamellae 102 of the second series. The upstream lamellae 102 of the second series are positioned between the upstream faces of the stilts 70 and the downstream faces of the upstream lamellae 101 of the first series. In addition, the upstream lamellae 101, 102 of the first and second series are arranged such that at least two adjacent upstream lamellae 101 of the first series are axially superimposed on an upstream lamella 102 of the second series. In other words, the upstream lamellae 101 of the first series and the upstream lamellae 102 of the second series overlap, that is, are circumferentially offset, so as to limit gas leakage via the gaps between two circumferentially adjacent upstream lamellae.

Advantageously, the upstream lamellae 101, 102 of the first and second series have the general shape of a T.

The head 101-1, or radially outer portion, of the upstream lamellae 101, 102 is configured to face the upstream face of at least two circumferentially adjacent stilts 70 or to face the upstream face of at least two circumferentially adjacent upstream lamellae 101, 102. In particular, the head 101-1 of the upstream lamellae 101 of the first series bears axially against the upstream face of at least two circumferentially adjacent upstream lamellae 102 of the second series. The head 102-1 of the upstream lamellae 102 of the second series bears axially against the upstream faces of at least two circumferentially adjacent stilts 7.

Furthermore, the root 101-2, 102-2, or radially inner portion, of the upstream lamellae 101 102 of the first and second series face at least one root 50 of a vane 40 mounted in a slot 31 of the disc 30. Moreover, the roots 101-2, 102-2 of the upstream lamellae 101 102 of the first and second series form a lug for rotationally blocking said upstream lamellae 101, 102. In particular, the root 101-2, 102-1 of the upstream lamellae 101, 102 of the first and second series is in circumferential abutment against an upstream rim 32-1 of a tooth 32 of the disc 30.

In addition, the axial retention means include downstream lamellae 103, 104 disposed downstream of the disc 30 and radially outer and inner holding means for holding said downstream lamellae 103, 104 radially and axially facing the slots 31 of the disc 30.

Advantageously, the radially outer holding means are formed by radial grooves 62-2 provided in the inner faces of the downstream rims 62 of the platforms 60. Thus, when the platforms 60 are arranged circumferentially end to end, the radial grooves 62-2 placed end to end form an annular radial groove. Moreover, the radially inner holding means are formed by radial hooks 33 extending radially from the downstream face of each tooth 32 of the disc 30. Thus, the head 103-1, 104-1 of each downstream lamella 103, 104 is held, at its radially outer end, by at least one radial groove 62-2 and, at its radially inner end, by at least two adjacent radial hooks 33.

Moreover, similarly to the upstream lamellae 101, 102, the downstream lamellae 103, 104 are disposed facing the slots 31 of the disc 30 so as to axially block the roots 80 of the vanes 40 in said slots 31. In addition, the downstream lamellae 103, 104 consist of a first series and a second series circumferentially distributed about the axis X of the rotor 20. In addition, the downstream lamellae 103 of the first series and the downstream lamellae 104 of the second series are axially superimposed. In particular, the downstream lamellae 104 of the second series are positioned between the downstream faces of the stilts 70 of the vanes 40 and the upstream faces of the downstream lamellae 103 of the first series. In addition, the downstream lamellae 103, 104 of the first and second series are arranged such that at least two circumferentially adjacent downstream lamellae 103 of the first series are axially superimposed on a downstream lamella 104 of the second series. In other words, the downstream lamellae 103 of the first series and the downstream lamellae 104 of the second series overlap, that is, are circumferentially offset, so as to limit gas leakage via the gaps between two circumferentially adjacent downstream lamellae.

Advantageously, the downstream lamellae 103, 104 of the first and second series have the general shape of a T.

The head 103-1, or radially outer portion, of the downstream lamellae 103, 104 are configured to face the downstream face of at least two circumferentially adjacent stilts 70 or to face the downstream face of at least two circumferentially adjacent downstream lamellae 103, 104. In particular, the head 103-1 of each downstream lamella 103 of the first series bears axially against the downstream faces of at least two downstream lamellae 104 of the second series while the head 104-1 of each downstream lamella 104 of the third series bears axially against the downstream faces of at least two stilts 7. Each head 103-1, 104-1 of the downstream lamellae 103, 104 of the first and second series bears radially against two adjacent radial hooks 33.

Furthermore, the root 103-2, 104-2 of the downstream lamellae 103, 104 of the first and second series is positioned between two adjacent radial hooks 33, facing a root 80 of a vane 40. Thus, the root 103-2, 104-2 of each of said downstream lamellae 103, 104 forms a lug which is in circumferential abutment against a radial hook 33 of the disc 30 so as to rotationally block said downstream lamella 103, 104.

Advantageously, the upstream clamp 15 and/or the upstream lamellae 101, 102 and/or the downstream lamellae 103, 104 include(s) ports (not illustrated) which ensure the routing of a cold air flow, illustrated by arrows, towards the bottom of the slots of the disc 3 so as to ensure the cooling of the disc 30 and the roots 80 of the moving vanes 40.

Advantageously, the vanes 40 and the upstream and downstream lamellae 101, 102, 103, 104 are made of different materials. Thus, the vanes 40 are for example made of a ceramic matrix composite material while the upstream and downstream lamellae 101, 102, 103, 104 are for example made of metal material. In an alternative embodiment, the vanes 40 and the lamellae 101, 102, 103, 104 are made of the same material, for example of ceramic matrix composite type.

The invention also relates to a method for mounting the rotor 20 described above, In a first step, the sealing members 90 are positioned in the side cavities 71 provided in the stilts 70 of the vanes 40.

In a second step, the roots 80 of the vanes 40 are partially inserted into the slots 31 of the disk 30, preferably over half the width of the disk 30.

In a third step, the downstream lamellae 103, 104 of the first and second series are positioned inside the radial hooks 33. In particular, the downstream lamellae 103, 104 are arranged so that the head 103-1, 104-1 of said downstream lamellae 103, 104 is held by two adjacent radial hooks 33 and their root 103-2, 104-2 is positioned between these two radial hooks 33. Moreover, the downstream lamellae 103, 104 of the first and second series are axially superimposed such that at least two circumferentially adjacent downstream lamellae 103 of the first series are axially superimposed on a downstream lamella 104 of the second series.

In a fourth step, the downstream lamellae 103, 104 of the first and second series are placed obliquely in the radial hooks 33 so as to bring the radially outer ends of said lamellae 103, 104 closer to the downstream rim 62 of the platforms 60 of the vanes 40.

In a fifth step, the roots 80 of the vanes 40 are fully inserted into the slots 31 of the disc 30 and the radially outer ends of the downstream lamellae 103, 104 of the first and second series are positioned inside the radial grooves 62-1 provided in the downstream rims 62 of the platforms 60 of the vanes 40.

In a sixth step, the upstream lamellae 101, 102 of the first and second series are placed in the housing formed by the annular shoulder 94-4 of the upstream clamp 97. In particular, the upstream lamellae 101, 102 of the first and second series are arranged so that at least two circumferentially adjacent upstream lamellae 101 of the first series are axially superimposed on an upstream lamella 102 of the second series. The head 101-1 of the upstream lamellae 101 of the first series then bears axially against the upstream faces of at least two upstream lamellae 102 of the second series while the head 102-1 of the upstream lamellae 102 of the second series bears axially against the upstream faces of at least two circumferentially adjacent stilts 7. Furthermore, the root 101-2, 102-2 of the upstream lamellae 101, 102 of the first and second series is in circumferential abutment against an upstream rim 32-1 of a tooth 32 of the disc 30.

In a seventh step, the upstream clamp 97 is fixed to an upstream flange of the disc 30 of the rotor 20 so that the radially outer ends of the upstream lamellae 101, 102 of the first and second series bear radially against the inner face of the upstream rims 61 of the platforms 60 and so that the radially inner ends of the upstream lamellae 101, 102 of the first and second series bear radially against the radial bearing surface formed by the annular shoulder 97-4 of the upstream clamp 97.

Of course, the invention is not limited to the different embodiments described, and alternative embodiments are possible.

The invention claimed is:

1. A rotor of a turbine extending about an axis and comprising:

a disc centered on the axis and including slots and a plurality of teeth provided in an outer periphery of the disc, the slots being circumferentially distributed around the disc and the teeth each being delimited by two circumferentially adjacent slots, a plurality of vanes, each vane comprising:

a blade which extends radially with respect to the axis a root formed in radial extension of the blade, configured to be mounted in a respective slot of the disc, a platform located between the blade and the root of the vane, wherein the disc comprises an axial retention system configured to axially hold the roots of the vanes in the slots of the disc, wherein the axial retention system includes a first series and a second series of lamellae circumferentially distributed about the axis, the first series and the second series of lamellae have the general shape of a T and being axially superimposed and arranged so that:

at least two of the lamellae of the first series are circumferentially adjacent to each other and at least two of the lamellae of the second series are circumferentially adjacent to each other, an upper part of each of the T-shape of the at least two circumferentially adjacent lamellae of the first series are axially superimposed on an upper part of the T-shape of a lamella of the second series and are circumferentially offset, each lamella of the first and second series is disposed facing a slot of the disc so as to axially block the root of a vane of the plurality of vanes mounted in said slot of the disc.

2. The rotor of the turbine according to claim 1, wherein the first series and the second series of lamellae include downstream lamellae mounted downstream of the disc, the downstream lamellae of the first series and of the second series being axially superimposed and arranged such that:

at least two circumferentially adjacent downstream lamellae of the first series are axially superimposed on a downstream lamella of the second series, and each downstream lamella of the first and second series is disposed facing a slot of the disc so as to axially block the root of a vane mounted in said slot of the disc.

3. The rotor of the turbine according to claim 2, wherein the axial retention system includes radially inner holding means and radially outer holding means configured to hold axially and radially the downstream lamellae of the first and second series facing the slots of the disc.

4. The rotor of the turbine according to claim 3, wherein the radially inner holding means are formed by radial hooks of the disc, each radial hook extending radially from a downstream face of a tooth of the plurality of teeth of the disc and being configured to receive a circumferential end of a radially outer portion of a downstream lamella.

5. The rotor of the turbine according to claim 3, wherein the radially outer holding means are formed by radial grooves formed in the platforms of the vanes, each radial groove being provided in an inner face of a downstream rim of a platform and being configured to receive the radially outer portion of a downstream lamella.

6. The rotor of the turbine according to claim 1, wherein the vanes and the lamellae are made of different materials.

7. The rotor of the turbine according to claim 6, wherein the vanes are made from a ceramic matrix material and the lamellae are made from a metal material.

8. A method for mounting the rotor of the turbine according to claim 1, comprising:

inserting the roots of the vanes into the slots of the disc, positioning the first series and the second series of lamellae so that at least two circumferentially adjacent lamellae of the first series are axially superimposed on a lamella of the second series and that each lamella of the first and second series is disposed facing a slot of the disc so as to axially block the root of a vane of the plurality of vanes mounted in said slot of the disc.

9. The rotor of the turbine according to claim 1, wherein the at least two circumferentially adjacent lamellae of the first series are located at a first position on said axis and the lamella of the second series, on which the at least two circumferentially adjacent lamellae of the first series are axially superimposed, is located at a second position on said axis that is offset relative to the first position along said axis.

10. The rotor of the turbine according to claim 9, wherein the lamellae of the first series form a first layer of lamellae located at said first position on said axis and the lamellae of the second series form a second layer of lamellae located at said second position on said axis.

11. A rotor of a turbine extending about an axis and comprising:

a disc centered on the axis and including slots and a plurality of teeth provided in an outer periphery of the disc, the slots being circumferentially distributed around the disc and the teeth each being delimited by two circumferentially adjacent slots, a plurality of vanes, each vane comprising:

a blade which extends radially with respect to the axis a root formed in radial extension of the blade, configured to be mounted in a respective slot of the disc, a platform located between the blade and the root of the vane, wherein the disc comprises an axial retention system configured to axially hold the roots of the vanes in the slots of the disc, wherein the axial retention system includes a first series and a second series of lamellae circumferentially distributed about the axis, the first series and the second series of lamellae being axially superimposed and arranged so that:

at least two of the lamellae of the first series are circumferentially adjacent to each other and at least two of the lamellae of the second series are circumferentially adjacent to each other, the at least two circumferentially adjacent lamellae of the first series are axially superimposed on a lamella of the second series and are circumferentially offset, each lamella of the first and second series is disposed facing a slot of the disc so as to axially block the root of a vane of the plurality of vanes mounted in said slot of the disc, wherein each vane includes a stilt located between the root and the platform of said vane and having an upstream face and a downstream face, and wherein the lamellae of the first and second series have the general shape of a T, each of said lamellae including:

a radially outer portion configured to face one face of at least two circumferentially adjacent stilts or to face at least two circumferentially adjacent lamellae, a radially inner portion configured to face a root of a vane.

12. A rotor of a turbine extending about an axis and comprising:

a disc centered on the axis and including slots and a plurality of teeth provided in an outer periphery of the disc, the slots being circumferentially distributed around the disc and the teeth each being delimited by two circumferentially adjacent slots, a plurality of vanes, each vane comprising:

a blade which extends radially with respect to the axis a root formed in radial extension of the blade, configured to be mounted in a respective slot of the disc, a platform located between the blade and the root of the vane, wherein the disc comprises an axial retention system configured to axially hold the roots of the vanes in the slots of the disc, wherein the axial retention system includes a first series and a second series of lamellae circumferentially distributed about the axis, the first series and the second series of lamellae being axially superimposed and arranged so that:

at least two of the lamellae of the first series are circumferentially adjacent to each other and at least two of the lamellae of the second series are circumferentially adjacent to each other, the at least two circumferentially adjacent lamellae of the first series are axially superimposed on a lamella of the second series and are circumferentially offset, each lamella of the first and second series is disposed facing a slot of the disc so as to axially block the root of a vane of the plurality of vanes mounted in said slot of the disc, wherein the first series and the second series of lamellae include upstream lamellae mounted upstream of the disc, the upstream lamellae of the first series and of the second series being axially superimposed and arranged such that:

at least two circumferentially adjacent upstream lamellae of the first series are axially superimposed on an upstream lamella of the second series and, each upstream lamella of the first and second series is disposed facing a slot of the disc so as to axially block the root of a vane mounted in said slot of the disc, the axial retention system including an annular upstream clamp fixed on to the disc and holding the upstream lamellae of the first series and of the second series against the disc.

13. The rotor of the turbine according to claim 12, wherein the platform of each vane includes a main wall having an upstream rim, each upstream lamella of the first series and of the second series bearing radially against at least one inner face of an upstream rim.

14. A rotor of a turbine extending about an axis and comprising:

a disc centered on the axis and including slots and a plurality of teeth provided in an outer periphery of the disc, the slots being circumferentially distributed around the disc and the teeth each being delimited by two circumferentially adjacent slots, a plurality of vanes, each vane comprising:

a blade which extends radially with respect to the axis a root formed in radial extension of the blade, configured to be mounted in a respective slot of the disc, a platform located between the blade and the root of the vane, wherein the disc comprises an axial retention system configured to axially hold the roots of the vanes in the slots of the disc, wherein the axial retention system includes a first series and a second series of lamellae circumferentially distributed about the axis, the first series and the second series of lamellae have the general shape of a T and being axially superimposed and arranged so that:

an upper part of each of the T-shape of at least two circumferentially adjacent lamellae of the first series are axially superimposed on an upper part of the T-shape of a lamella of the second series and are circumferentially offset, each lamella of the first and second series is disposed facing a slot of the disc so as to axially block the root of a vane of the plurality of vanes mounted in said slot of the disc, wherein the at least two circumferentially adjacent lamellae of the first series are located at a first position on said axis and the lamella of the second series, on which the at least two circumferentially adjacent lamellae of the first series are axially and circumferentially superimposed, is located at a second position on said axis that is offset relative to the first position along said axis.

* * * * *